United States Patent
Wang et al.

(10) Patent No.: US 10,452,692 B2
(45) Date of Patent: Oct. 22, 2019

(54) METHOD AND AN APPARATUS FOR FAST MERGING INVERTED CHAINS

(71) Applicant: GUANGZHOU SHENMA MOBILE INFORMATION TECHNOLOGY CO., LTD., Guangzhou (CN)

(72) Inventors: Gang Wang, Guangzhou (CN); Mingcheng Wan, Guangzhou (CN); Honglei Zeng, Guangzhou (CN)

(73) Assignee: GUANGZHOU SHENMA MOBILE INFORMATION TECHNOLOGY CO., LTD., Guangzhou (CN)

(*) Notice: Subject to any disclaimer, the term of this patent is extended or adjusted under 35 U.S.C. 154(b) by 220 days.

(21) Appl. No.: 15/270,725

(22) Filed: Sep. 20, 2016

(65) Prior Publication Data

US 2017/0083610 A1 Mar. 23, 2017

(30) Foreign Application Priority Data

Sep. 22, 2015 (CN) .......................... 2015 1 0611489

(51) Int. Cl.
*G06F 16/31* (2019.01)
*G06F 16/33* (2019.01)

(52) U.S. Cl.
CPC .......... *G06F 16/319* (2019.01); *G06F 16/325* (2019.01); *G06F 16/334* (2019.01)

(58) Field of Classification Search
CPC ..... G06F 16/319; G06F 16/325; G06F 16/334
USPC ...................................................... 707/742
See application file for complete search history.

(56) References Cited

U.S. PATENT DOCUMENTS

| 5,893,094 | A   | * | 4/1999  | Horowitz ............. G06F 16/316 |
| 6,112,204 | A   | * | 8/2000  | Horowitz ............. G06F 16/316 |
| 6,446,066 | B1  | * | 9/2002  | Horowitz ............. G06F 16/316 707/759 |
| 7,370,035 | B2  | * | 5/2008  | Gross ................. G06F 17/30398 |
| 9,501,506 | B1  | * | 11/2016 | Fontoura ........... G06F 17/30631 |
| 2006/0053157 | A1 | * | 3/2006 | Pitts ...................... G06F 16/148 |
| 2009/0171944 | A1 | * | 7/2009 | Hadjieleftheriou ........................ G06F 17/30442 |

(Continued)

FOREIGN PATENT DOCUMENTS

| CN | 102456055 A | 5/2012 |
| CN | 103198079 A | 7/2013 |
| KR | 20140128770 A | * 11/2014 ......... G06F 9/30032 |

OTHER PUBLICATIONS

Zhao, Changlin, Organization and Optimal Merge Analysis on Inverted Files, Journal of Southwest Nationalities College, Nov. 1995, 6 Pages, Issue 4, China.

*Primary Examiner* — Shahid A Alam
(74) *Attorney, Agent, or Firm* — Anova Law Group LLC

(57) ABSTRACT

In accordance with various embodiments of the disclosed subject matter, a method for fast merging inverted chains, and a related apparatus are provided. In some embodiments, the method comprises: pre-setting an inverted index including a plurality of inverted chains and recording a length of each inverted chain; searching the inverted index and obtaining a subset of the plurality of inverted chains that correspond to at least one keyword; sorting the subset of the plurality of inverted chains in an ascending order of the lengths of the subset of multiple inverted chains; and merging the subset of the plurality of inverted chains sequentially as the ascending order starting from one of the subset of the plurality of inverted chains that has the shortest length.

20 Claims, 5 Drawing Sheets

(56) References Cited

U.S. PATENT DOCUMENTS

| | | | |
|---|---|---|---|
| 2015/0186519 A1* | 7/2015 | Popov | G06F 17/30622 707/723 |
| 2016/0063065 A1* | 3/2016 | Khatri | G06F 17/30867 707/723 |
| 2016/0275178 A1* | 9/2016 | Liu | G06F 17/30864 |

* cited by examiner

US 10,452,692 B2

METHOD AND AN APPARATUS FOR FAST MERGING INVERTED CHAINS

CROSS-REFERENCES TO RELATED APPLICATIONS

This patent application claims priority of Chinese Patent Application No. 201510611489.0 filed on Sep. 22, 2015, the entire content of which is incorporated by reference herein.

TECHNICAL FIELD

The disclosed subject matter generally relates to the field of information retrieval and, more particularly, relates to a method for fast merging inverted chains and an apparatus thereof.

BACKGROUND

With a rapid development of the information technology, more and more people use the Internet to find a variety of information, including latest released news, progresses of new technologies, professional and academic papers, information published or shared on social networks such as comments, blogs, discussion, etc. For example, a user may want to find detailed information about a news through the network, or to find an introduction of a certain technology, or to learn about other people's comments on a recent released film, etc. An important tool to achieve these network query requirements is a search engine.

A search engine is a system that can automatically collect information from the Internet using a certain strategy and a specific technique and, after organizing and processing the collected information, present to the user with the information relevant to the user's search. It is important to organize and process the collected information, and extracting the keywords, creating index documents, and sorting search results according to certain rules are the key factors, which can affect the searching speed.

In the search engine technology, the inverted index is a commonly used data structure. By using the inverted index, a list of documents that contain a keyword can be quickly obtained based on the keyword, and search results can be quickly generated and be fed back to the user.

However, the existing inverted index method may have certain problems. An overall search time is proportional to a number of data records that hit with the keyword. When an inverted chain of a keyword is very long, for example, a keyword "news" or "sport" may hit millions of results, it may need at least hundreds of milliseconds or even several seconds to complete the search.

Accordingly, the present disclosure provides a method for fast merging inverted chains and a related apparatus to at least partially alleviate one or more problems set forth above and to solve other problems in the art.

BRIEF SUMMARY

In accordance with some embodiments of the disclosed subject matter, a method for fast merging inverted chains, and a related apparatus are provided.

An aspect of the present disclosure provides a method for fast merging inverted chains, comprising: pre-setting an inverted index including a plurality of inverted chains and recording a length of each inverted chain; searching the inverted index and obtaining a subset of the plurality of inverted chains that correspond to at least one keyword; sorting the subset of the plurality of inverted chains in an ascending order of the lengths of the subset of multiple inverted chains; and merging the subset of the plurality of inverted chains sequentially as the ascending order starting from one of the subset of the plurality of inverted chains that has the shortest length.

In some embodiments, pre-setting the inverted index further comprises: generating a plurality of inverted chains that contain retrieval units and semantic units.

In some embodiments, each retrieval unit comprises at least one search keyword obtained by a small granularity text segmentation scheme.

In some embodiments, each semantic unit comprises at least one search keyword obtained by a large granularity text segmentation scheme.

In some embodiments, pre-setting the inverted index further comprises: sorting a plurality of documents recorded by the inversed chains in accordance with multidimensional features to rank high-quality documents near the head positions of the inversed chains.

In some embodiments, the multidimensional features of a document comprises author information of the document, view number of the document, quality information of the document.

In some embodiments, the at least one keyword is generated by using multi-granularity text segmentation scheme to a text associated with a user search query.

In some embodiments, the subset of the plurality of inverted chains are sorted by using one of the following methods: insertion sorting method, bubble sorting method, and selection sorting method.

In some embodiments, the method further comprises: suspending the merging process of the subset of multiple inverted chains when a preset number of documents ranked near the head positions of the inversed chains are recalled.

In some embodiments, the inverted index is set by using one of dichotomy method, trie method, and hash method.

Another aspect of the present disclosure provides an apparatus for fast merging inverted chains, comprising: an inverted index setup component configured for pre-setting an inverted index including a plurality of inverted chains and recording a length of each inverted chain; a searching component configured for searching the inverted index and obtaining a subset of the plurality of inverted chains that correspond to at least one keyword; a sorting component configured for sorting the subset of the plurality of inverted chains by an ascending order of the lengths of the subset of multiple inverted chains; and a merging component configured for merging the subset of the plurality of inverted chains sequentially as the ascending order starting from one of the subset of the plurality of inverted chains that has the shortest length.

In some embodiments, the inverted index setup component is further configured for generating a plurality of inverted chains that contain retrieval units and semantic units.

In some embodiments, each retrieval unit comprises at least one search keyword obtained by a small granularity text segmentation scheme.

In some embodiments, each semantic unit comprises at least one search keyword obtained by a large granularity text segmentation scheme.

In some embodiments, the apparatus further comprises: a priority sorting component configured for sorting a plurality of documents recorded by the inversed chains in accordance with multidimensional features to rank high-quality documents near the head positions of the inversed chains.

In some embodiments, the multidimensional features of a document comprises author information of the document, view number of the document, quality information of the document.

In some embodiments, the searching component is further configured for generating the at least one keyword by using multi-granularity text segmentation scheme to a text associated with a user search query.

In some embodiments, the sorting component is further configured for sorting the subset of the plurality of inverted chains by using one of the following methods: insertion sorting method, bubble sorting method, and selection sorting method.

In some embodiments, the merging component is further configured for: suspending the merging process of the subset of multiple inverted chains when a preset number of documents ranked near the head positions of the inversed chains are recalled.

In some embodiments, the inverted index setup component is further configured for setting the inverted index by using one of dichotomy method, trie method, and hash method.

Other aspects of the present disclosure can be understood by those skilled in the art in light of the description, the claims, and the drawings of the present disclosure.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements. It should be noted that the following drawings are merely examples for illustrative purposes according to various disclosed embodiments and are not intended to limit the scope of the present disclosure.

DETAILED DESCRIPTION

For those skilled in the art to better understand the technical solutions of the disclosed subject matter, reference will now be made in detail to exemplary embodiments of the disclosed subject matter, which are illustrated in the accompanying drawings. Wherever possible, the same reference numbers will be used throughout the drawings to refer to the same or like parts.

In accordance with various embodiments, the disclosed subject matter provides a method for fast merging inverted chains, and a related apparatus.

Figure 1:
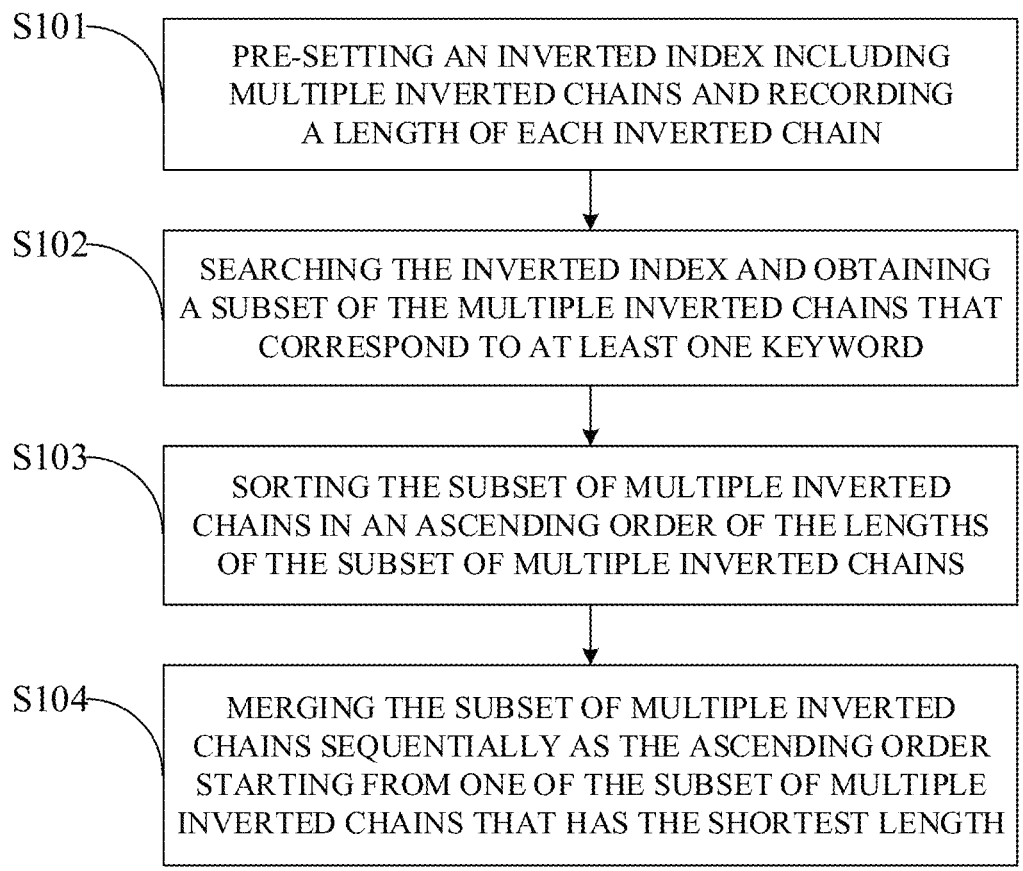
FIG. 1 is a flowchart of an exemplary method for fast merging inverted chains in accordance with some embodiments of the disclosed subject matter.

Referring to FIG. 1, a flowchart of an exemplary method for fast merging inverted chains is shown in accordance with some embodiments of the disclosed subject matter.

As illustrated, the method can include the following steps.

Step S101: Pre-setting an inverted index including multiple inverted chains and recording a length of each inverted chain.

The index is an important part of searching technology. A simple, effective, and high-performance index can help a user quickly obtain useful information about a search query of the user. An inverted index can be used in the searching technique. An inverted index can be regarded as an array of linked lists. A header of each linked chain contains a keyword of the query of the user. The follow-up units of each linked list include all document labels containing the keyword, and any other suitable information such as a frequency of the keyword in a document, or position information of the keyword in the document. Thus, during a searching process, the headers of multiple linked lists containing one or more keywords of a user search query can be used for finding the documents that contain the one or more keywords. Since it is not necessary to search all the documents individually based on the one or more keywords, the retrieval efficiency can be dramatically improved.

An inverted index can be generated by using any suitable method include dichotomy method, trie method, and hash method, etc. Taking the dichotomy method as an example, an inverted index can be generated to include multiple searching index entries that are arranged in a certain order, such as an alphabetic order, or a Chinese character internal code (CICS) sequence order. The data corresponding to the multiple searching index entries can be stored in association with the multiple searching index entries. In response to a user search query, a dichotomy search can be performed base on one or more keywords of the user search query to find the corresponding one or more searching index entries from the multiple ordered searching index entries. After obtaining the corresponding one or more searching index entries that match the one or more keywords of the user search query, the associated data can be retrieved. And then the information of the retrieved data can be outputted to the user.

It should be noted that, any other suitable methods for generating an inverted index can be incorporated herein. When an inverted index is being generated, the length of each inverted chain in the inverted index can be recorded.

In addition, the inverted index generating process also includes generating multiple inverted chains that contain retrieval units and semantic units. A retrieval unit includes a search keyword obtained by a small granularity text segmentation scheme. A semantic unit includes search keywords obtained by a large granularity text segmentation scheme. The semantical unit may include at least two retrieval units. The advantages of using multi-granularity text segmentation in the inverted index generating process include not only improving the recall rate of the search results, but also reducing the number and lengths of the inverted chains to be merged, and thereby reducing the number of traverses during the search process.

In addition, the inverted index generating process also includes sorting the documents recorded by the inversed chains in accordance with multidimensional features. In some embodiments, the documents sorting process can be performed before receiving any user search queries. In one embodiment, the documents sorting process can be implemented in an off-line status.

By using the documents sorting process, some high-quality documents can be ensured to be ranked near the head positions of the inversed chains. In some embodiments, the multidimensional features of a document can include author information of the document, viewing number of the document, and quality information of the document, etc. For example, a document can be determined having high-quality if a viewing number of the document exceeds a preset threshold value. As another example, a document can be determined having high-quality if an author of the document is well-known in the art, such as an academy of science, an university professor, a public famous author, etc. As yet another example, a document can be determined having high-quality based on the quality information of the document, such as the content of the document, the citing number of the document, the length of the document, etc.

Since the high-quality documents are ranked near the head positions of the inversed chains, some subsequent merging processes may be ended in advance by only recalling a certain number of documents, such as few hundreds or few thousands documents.

Step S102: Searching the inverted index and obtaining a subset of the multiple inverted chains that correspond to at least one keyword.

The at least one of the keywords can be generated by segmenting a certain text document by using the multi-granularity text segmentation scheme. For Chinese search engines, the granularity is a measure of the amount of information containing in the text after the text segmentation. A large granularity means that the text contains a large amount of information, and vice versa.

When a user inputs a query text through a user interface of a search engine, the search engine can segment the query text in order to obtain more comprehensive and accurate search results. Text segmentation technique is one of the core techniques of the search engine technology. Especially for Chinese search engine, an accurate text segmentation is essential to the search results.

English text is based on words separated by spaces, while Chinese text is based on characters. That is, to understand a meaning of a term, a phrase, or even a sentence in Chinese, all the characters must be put together for consideration.

Taking the English sentence "I am a student," compared with the Chinese sentence in a same meaning "我是一个学生" as an example, the computer can simply recognize that English word "student" is a single word by determining the positions of spaces and punctuations. However, the computer cannot easily recognize that the combination of two Chinese characters "学" and "生" expresses a single Chinese word meaning "student."

As another example, in the Chinese sentence "王君虎去北京了" the combination of three Chinese characters "王君虎" is a single word representing a person's name. But it is difficult for a computer to recognize such fact.

In some embodiments, the at least one of the keywords can be generated by using any suitable text segmentation method. In one embodiment, multi-granularity text segmentation scheme is used herein as an example.

Step S103: Sorting the subset of multiple inverted chains in an ascending order of the lengths of the subset of multiple inverted chains.

In accordance with the length of the each inverted chain, the subset of multiple inverted chains can be sorted as an ascending order by using any suitable sorting method, such as insertion sorting method, bubble sorting method, and selection sorting method, etc.

For the insertion sorting method, an i-th element in a list can be compared with an element on the next to the i-th element. If the two element are in an wrong order, then the two elements can be swapped. The comparing and swapping process can be repeated until an element on the next to the i-th element is in a right order.

For the bubble sorting method, each pair of adjacent elements are compared, and then swapped if they are in the wrong order. The pass through the list is repeated until no swaps are needed, which indicates that the list is sorted. During the sorting process, the small elements are always moving forward, and the large elements are moving backward. Since the sorting process is similar to the rising of bubbles, so it is called bubble sort.

For the selection sorting method, an input list is divided into two parts: the sub-list of elements already sorted, which is built up from left to right at the left of the list, and the sub-list of elements remaining to be sorted that occupy the rest of the list. Initially, the sorted sub-list is empty and the unsorted sub-list is the entire input list. Depending on sorting order, the sorting process proceeds by finding the smallest or largest element in the unsorted sub-list, exchanging it with the leftmost unsorted element, and moving the sub-list boundaries one element to the right.

Step S104: Merging the subset of multiple inverted chains sequentially as the ascending order starting from one of the subset of multiple inverted chains that has the shortest length.

Upon completion the sorting of the subset of multiple inverted chains that correspond to at least one keyword of the user's search query, the subset of multiple inverted chains can be sequentially merged as the ascending order starting from one of the subset of multiple inverted chains that has the shortest length.

By following, a specific example is described to illustrate the details of the merging process.

In the specific example, a user wants to retrieve the query text "市场营销科学方法" ("marketing scientific method" in English) through a search engine. The search engine can firstly divide the query text "市场营销科学方法" into four keywords: "市场" ("market" in English), "营销" ("marketing" in English), "科学" ("science" in English), and "方法" ("method" in English). Then by using the inverted index, four inverted chains containing the four keywords respectively can be obtained.

Supposing a length of the inverted chain containing the keyword "市场" ("market" in English) is 200, a length of the inverted chain containing the keyword "营销" ("marketing" in English) is 170, a length of the inverted chain containing the keyword "科学" ("science" in English) is 150, and a length of the inverted chain containing the keyword "方法" ("method" in English) is 220.

Next, the four inverted chains can be sorted as an ascending order based on the lengths of the four inverted chains. So the sorted order of the four inverted chains is as follows: ① the inverted chain containing the keyword "科学" ("science" in English), ② the inverted chain containing the keyword "营销" ("marketing" in English), ③ the inverted chain containing the keyword "市场" ("market" in English), ④ the inverted chain containing the keyword "方法" ("method" in English).

Next, the four inverted chains can be sequentially merged as following order: ① merging the inverted chain containing the keyword "科学" ("science" in English) and the inverted chain containing the keyword "营销" ("marketing" in English) to form an inverted chain containing the two keywords of "科学" ("science" in English) and "营销" ("marketing" in English); ② merging the inverted chain obtained from step ① and the inverted chain containing the keyword "市场" ("market" in English) to form an inverted chain containing the three keywords of "科学" ("science" in English), "营销" ("marketing" in English), and "市场" ("market" in English); ③ merging the inverted chain obtained form step ② and the inverted chain containing the keyword "方法" ("method" in English) to form an inverted chain containing the four keywords of "科学" ("science" in English), "营销" ("marketing" in English), "市场" ("market" in English), and "方法" ("method" in English). Finally, the desired search results can be filtered out based on the inverted chain obtained from step ③.

Figure 2:
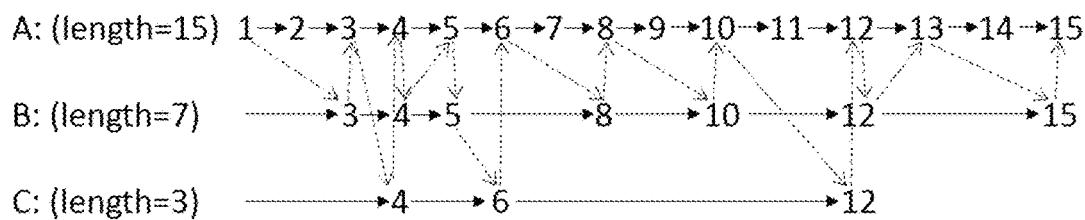
FIG. 2 is a schematic diagram of a merging process of unsorted inverted chains.
Figure 3:
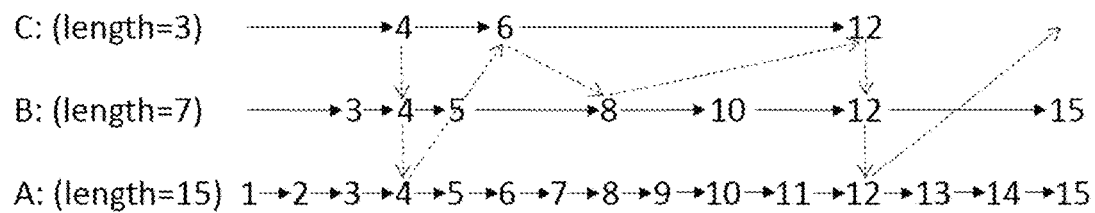
FIG. 3 is a schematic diagram of a merging process of sorted inverted chains using single-granularity text segmentation scheme in accordance with some embodiments of the disclosed subject matter.

Referring to FIGS. 2 and 3, an exemplary comparison between a first merging process of unsorted inverted chains and a second merging process of sorted inverted chains is shown.

For example, as illustrated in FIGS. 2 and 3, three inverted chains A, B and C can correspond to a user search query including three keywords "a", "b" and "c." The inverted chain A records fifteen documents (labelled in 1, 2, 3, . . . 15) containing the keyword "a." So the length of the inverted chain A is 15. The inverted chain B records seven documents (labelled in 3, 4, 5, 8, 10, 12, and 15) containing the keyword "b." So the length of the inverted chain B is 7. The inverted chain C records three documents (labelled in 4, 6, and 12) containing the keyword "c." So the length of the inverted chain C is 3. The solid lines with arrows in each inverted chain means a recording order of the documents containing the keyword.

For the first merging process of the unsorted inverted chains illustrated in FIG. 2, a comparing and traversing order can be represented by the dashed lines with arrows. As illustrated, a number of comparisons and traverses during the first merging process of the unsorted inverted chains is 19.

For the second merging process of the sorted inverted chains illustrated in FIG. 3, a comparing and traversing order can be represented by the dashed lines with arrows. As illustrated, the comparing and traversing process can start from the first document labelled in 4 of the inverted chain C that has a shortest length, and follow an ascending order of the lengths of the inverted chains to the document labelled in 4 of the inverted chain B and the document labelled in 4 of inverted chain A. Therefore, a total number of comparisons and traverses during the second merging process of the sorted inverted chains as an ascending order is reduced to 8.

Accordingly, merging the inverted chains with short lengths in advance and following an ascending order can reduce the number of comparisons and traverses during the merging process, thus can accelerate the merging speed and reduce the time required for searching.

In some embodiments, the merging process of the subset of multiple inverted chains can be suspended when a preset number of documents ranked near the head positions of the inversed chains are recalled. Specifically, the inverted chains corresponding to the search query may have very long lengths, such as millions or tens of millions units of lengths. However, only dozens or hundreds of searching results may be really needed. So that a complete traversal of the inverted chains might be very time consuming and be very harmful to the user experience. Therefore, in order to ensure a reasonable response time for a user search query, a suspension of the merging process can be performed if enough searching results are obtained.

As described in step S101, in some embodiments, the inverted index generating process also includes sorting the documents recorded by the inversed chains in accordance with multidimensional features. So that high-quality documents can be ensured to be ranked near the head positions of the inversed chains. The high-quality documents may take only a small portion of the total documents recorded by the inverted chains, such as a few hundreds or a few thousands number of documents. Since the high-quality documents are ranked near the head positions of the inversed chains, the merging process can be suspended when the high-quality documents ranked near the head positions of the inversed chains are obtained. Thus, not only the number of traverses and the time required for searching can be reduced, but also the efficiency and the accuracy of the searching can be improved.

Accordingly, the disclosed method for fast merging inverted chains can merge the inverted chains with short lengths in advance, thereby has a small number of comparisons and traverses during the merging process. In addition, multi-granularity text segmentation is used in the inverted index generating process to generate multiple inverted chains including retrieval units and semantic units, which not only can increase the recall rate of the search results, but also can reduce the number and lengths of the inverted chains that are to be merged, as well as reduce the number of traverses. Further, the documents recorded by the inversed chains are sorted in accordance with multidimensional features to rank the high-quality documents near the head positions of the inversed chains. So that the merging process can be suspended earlier when a preset number of documents ranked near the head positions of the inversed chains are recalled. All these actions can reduce the time required for searching, improve the efficiency and accuracy of the searching, and thereby improve the overall performance of the search engine.

For a Chinese search engine, the Chinese text segmentation scheme can directly affect the accuracy of searching. If the text granularity is too large, accurate long keywords may be needed for obtain corresponding searching results. If the text granularity is too small, the accuracy of the searching results may be reduced.

Taking the Chinese term "北京饭店" ("Beijing hotel" in English) as an example, if the text granularity is just the term "北京饭店" ("Beijing hotel" in English) itself which is too large, then search queries including the four Chinese characters "北京饭店" ("Beijing hotel" in English) may get related articles. Conversely, search queries only include "北京" ("Beijing" in English) or "饭店" ("hotel" in English) may lead to improper results.

However, if the text granularity contains is too small, the term "北京饭店" ("Beijing hotel" in English) are divided into four Chinese characters "北" ("north" in English)/"京" ("capital" in English)/"饭" ("meal" in English)/"店" ("store" in English). In this case, a search query including any one of the four Chinese characters may result in articles related to the keyword "北京饭店" ("Beijing hotel" in English). For example, a search query may include the term "鞋店" ("shoe store" in English) can be divided into two Chinese characters "鞋" ("shoe" in English) and "店" ("store" in English). Since the text segment contains the Chinese character "店" ("store" in English) which is the same one as the fourth Chinese character "店" ("store" in English) of the term "北京饭店" ("Beijing hotel" in English), the search results of the search query including the term "鞋店" ("shoe store" in English) may contain many articles related to "北京饭店" ("Beijing hotel" in English). The results of articles related to "北京饭店" ("Beijing hotel" in English) are obviously not desired by the user.

Therefore, considering the example of the Chinese term "北京饭店" ("Beijing hotel" in English), an accurate text segmentation scheme should be two terms "北京" ("Beijing" in English) and "饭店" ("hotel" in English).

An accurate segmentation scheme is very important for search results. For example, in the field of electronic commerce, both sellers and buyers require a high search recall rate. A search recall rate is a ratio of a number of search results and a total number of all documents related to the search in a document library. Generally, a smaller segmentation granularity corresponds to a higher search recall rate. So in this example, a small granularity text segmentation scheme is more appropriate.

As another example, when a user is searching a website from massive web page data, a search accuracy rate is particularly important to the user. The search accuracy rate is a ratio of a number of search results that relate to the search query and a total number of all search results. In general, a larger segmentation granularity corresponds to a higher search accuracy rate. So in this example, a large granularity text segmentation scheme is more appropriate.

In different application stages of a same searching field, the requirements of the text segmentation do not have same text granularity. For example, a small granularity text segmentation scheme is needed for a search engine to find enough number of web pages, while a large granularity text segmentation scheme is needed for sorting stage for improve the search accuracy rate. However, a smaller granularity text segmentation scheme means longer inverted chains, more levels of text granularity, and more number of indexes, which may make a great impact of the performance of the searching system.

In some embodiments, the disclosed method for fast merging inverted chains uses multi-granularity text segmentation in advance to generate multiple inverted chains including retrieval units and semantic units, which can not only reduce the number of the inverted chains that are to be merged, but also reduce the lengths of the inverted chains.

Figure 4:
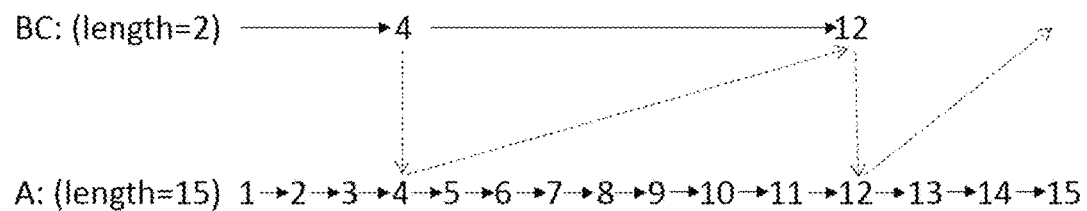
FIG. 4 is a schematic diagram of a merging process of sorted inverted chains using multi-granularity text segmentation scheme in accordance with some embodiments of the disclosed subject matter.

Referring to FIGS. 3 and 4, an exemplary comparison between the second merging process using single-granularity text segmentation scheme and a third merging process using multi-granularity text segmentation scheme is shown.

For the second merging process using single-granularity text segmentation scheme illustrated in FIG. 3, three inverted chains A, B and C can correspond to a user search query including three keywords "a", "b" and "c." As described above, the lengths of the three inverted chains A, B and C are 15, 7, and 3 respectively. The comparing and traversing order can be represented by the dashed lines with arrows, and the total number of comparisons and traverses during the second merging process using single-granularity text segmentation scheme is 8.

For the third merging process using multi-granularity text segmentation scheme illustrated in FIG. 4, keywords "b" and "c" are combined as a semantic unit "bc" by using a large granularity text segmentation. Since the corresponding inverted chain BC including the semantic unit "bc" is a subset of the intersection of the inverted chains B and C that include the keywords "b" and "c" respectively, so a length of the inverted chain BC is short than the length of the inverted chain B and the length of the inverted chain C. Assuming the length of the inverted chain BC is 2 and according to the dashed lines with arrows that represent comparing and traversing steps as illustrated in FIG. 4, a total number of comparisons and traverses during the third merging process using multi-granularity text segmentation scheme is only 4. Therefore, the number of traverses and the time required for searching can be further reduced.

As another specific example, a user wants to search the term "中华人民共和国 建立时间" ("establish time of People's Republic of China" in English). The retrieval units obtained from a small granularity text segmentation scheme are the following terms: "中华" ("China" in English), "人民" ("people" in English), "共和国" ("Republic" in English), "建立" ("establish" in English), and "时间" ("time" in English). The semantic units obtained from a large granularity text segmentation scheme are the following terms: "中华人民共和国" ("People's Republic of China" in English), "建立" ("establish" in English), and "时间" ("time" in English).

So by using the large and small granularity text segmentations, multiple inverted chains respectively including the terms of "中华" ("China" in English), "人民" ("people" in English), "共和国" ("Republic" in English), "建立" ("establish" in English), "时间" ("time" in English), and "中华人民共和国" ("People's Republic of China" in English) can be generated. The inverted chain including the term of "中华人民共和国" ("People's Republic of China" in English) has a shortest length. Since the merging process starts from one inverted chain that has the shortest length, and follows an ascending order. So the inverted chain including the term of "中华人民共和国" ("People's Republic of China" in English) can be merged with the inverted chain including the term of "建立" ("establish" in English) and the inverted chain including the term of "时间" ("time" in English). It can be seen that a number of inverted chains to be merged is small. So that the speed of merging process is increased, and the response time for a search query is decreased.

It should be noted that, various embodiments described above can be arbitrarily combined to reduce the number of traverses, reduce the time required for searching, improve the efficiency and accuracy of the searching, and thereby improve the overall performance of the search engine.

Figure 5A:
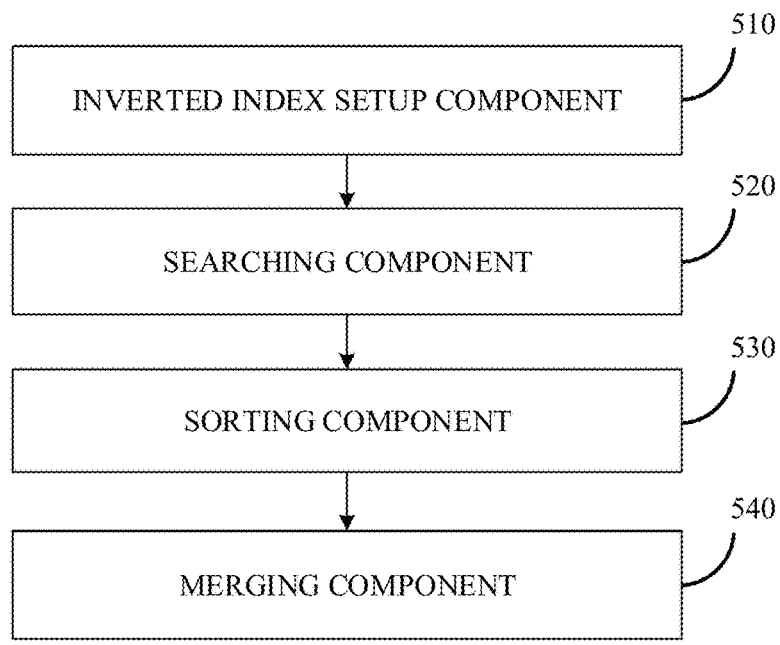
FIG. 5A is a schematic structural diagram of an exemplary apparatus for fast merging inverted chains in accordance with some embodiments of the disclosed subject matter.

Referring to FIG. 5A, a schematic structural diagram of an exemplary apparatus for fast merging inverted chains is shown in accordance with some embodiments of the disclosed subject matter.

As illustrated, the apparatus for fast merging inverted chains can include the following components.

An inverted index setup component 510 is configured for pre-setting an inverted index including multiple inverted chains and recording a length of each inverted chain.

A searching component 520 is configured for searching the inverted index and obtaining a subset of the multiple inverted chains that correspond to at least one keyword.

A sorting component 530 is configured for sorting the subset of multiple inverted chains by an ascending order of the lengths of the subset of multiple inverted chains.

A merging component 540 is configured for merging the subset of multiple inverted chains sequentially as the ascending order starting from one of the subset of multiple inverted chains that has the shortest length.

In some embodiments, the inverted index setup component 510 is further configured for generating multiple inverted chains that contain retrieval units and semantic units. The retrieval units include search keywords obtained by a small granularity text segmentation scheme while the semantic units include search keywords obtained by a large granularity text segmentation scheme.

Figure 5B:
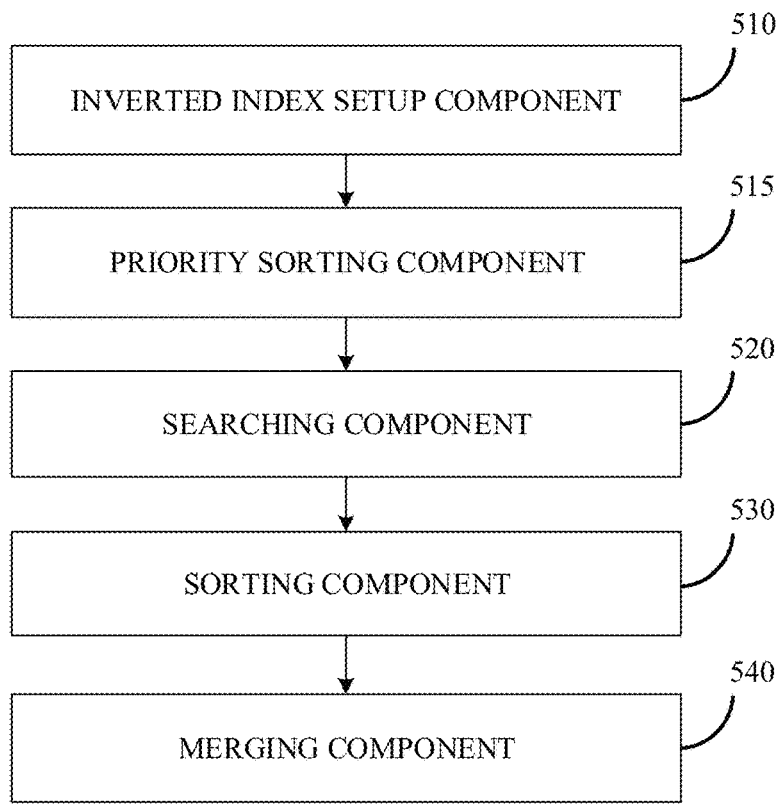
FIG. 5B is a schematic structural diagram of another exemplary apparatus for fast merging inverted chains in accordance with some other embodiments of the disclosed subject matter.

Referring to FIG. 5B, a schematic structural diagram of another exemplary apparatus for fast merging inverted chains is shown in accordance with some other embodiments of the disclosed subject matter.

As illustrated, the apparatus for fast merging inverted chains can further include a priority sorting component 515 configured for sorting the documents recorded by the inversed chains in accordance with multidimensional features. So that high-quality documents can be ensured to be ranked near the head positions of the inversed chains. In some embodiments, the multidimensional features of a document can include author information of the document, view number of the document, quality information of the documents, etc.

The disclosed various embodiments of the apparatus for fast merging inverted chains can be arbitrarily combined to reduce the number of traverses, reduce the time required for searching, improve the efficiency and accuracy of the searching, and thereby improve the overall performance of the search engine.

The detailed functions and the interactions of the components of the disclosed apparatus for fast merging inverted chains can be referred to the various embodiments of the method for fast merging inverted chains described above in connection with FIG. 1.

Accordingly, the disclosed apparatus for fast merging inverted chains can merge the inverted chains with short lengths in advance, thereby has a small number of comparisons and traverses. In addition, the disclosed apparatus can used the multi-granularity text segmentation in the inverted index generating process to generate multiple inverted chains including retrieval units and semantic units, which can not only increase the recall rate of the search results, but also reduce the number and lengths of the inverted chains that are to be merged, as well as reduce the number of traverses. Further, the disclosed apparatus can sort the documents recorded by the inversed chains in accordance with multidimensional features to rank the high-quality documents near the head positions of the inversed chains. So that the merging process can be suspended earlier when a preset number of documents ranked near the head positions of the inversed chains are recalled. All these actions can reduce the time required for searching, improve the efficiency and accuracy of the searching, and thereby improve the overall performance of the search engine.

Figure 6:
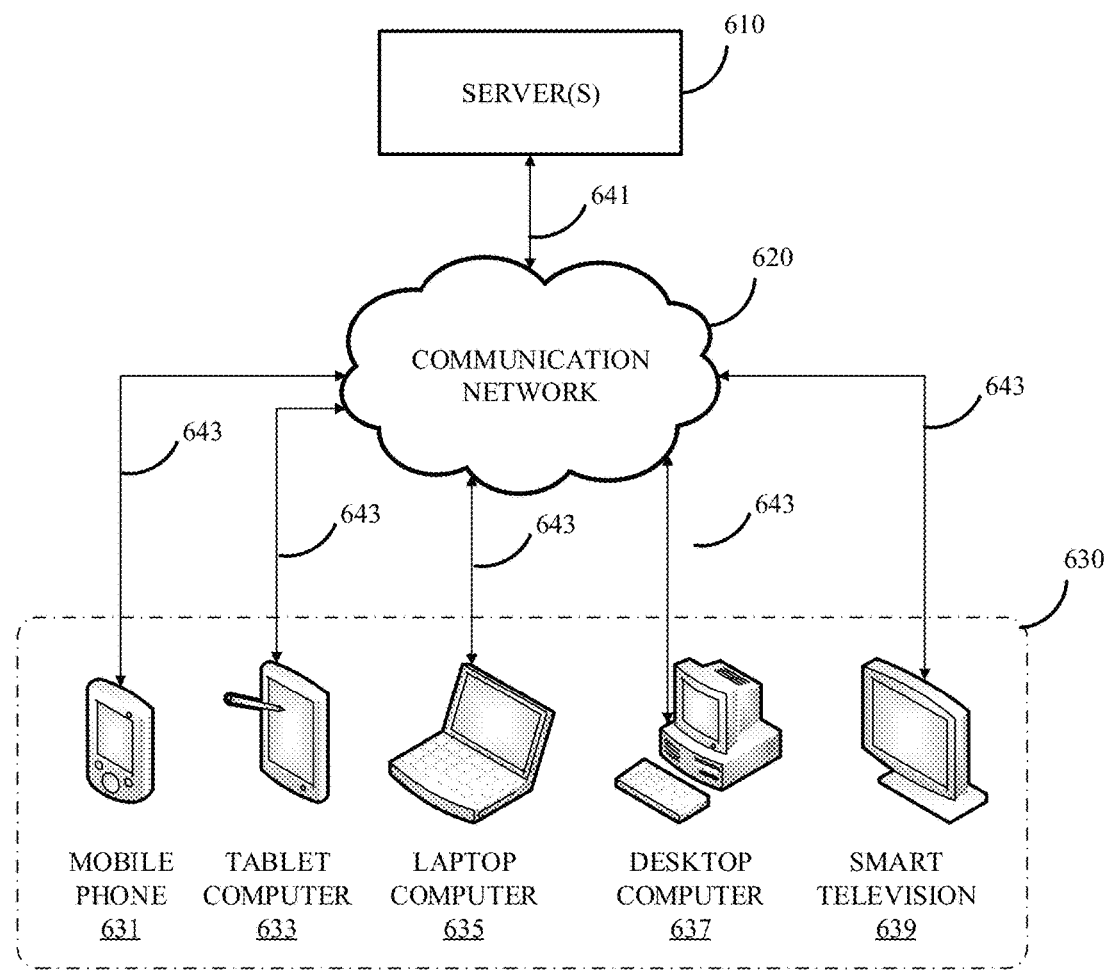
FIG. 6 is a schematic structural diagram of an exemplary system for fast merging inverted chains in accordance with some embodiments of the disclosed subject matter.

Referring to FIG. 6, an exemplary system for sharing comments in accordance with some embodiments of the disclosed subject matter is shown. As illustrated, the system can include one or more servers 610, a communication network 620, one or more user device 630, and/or any other suitable component. User devices 630 can be connected by one or more communication links 643 to communications network 620 that can be linked via a communication link 641 to a server 610.

In some embodiments, one or more steps of, or all of, method for fast merging inverted chains described above in connection with FIG. 1, can be implemented by one or more suitable hardware processors of server(s) 610, user device(s) 630, and/or other suitable component of the system.

Server(s) 610 can include any suitable device that is capable of pre-setting an inverted index including multiple inverted chains and recording a length of each inverted chain, searching the inverted index and obtaining a subset of the multiple inverted chains that correspond to at least one keyword, sorting the subset of multiple inverted chains as an ascending order of the lengths of the subset of multiple inverted chains, merging the subset of multiple inverted chains sequentially as the ascending order starting from one of the subset of multiple inverted chains that has the shortest length, and/or performing any other suitable function.

In some embodiments, communication network 620 can be any suitable combination of one or more wired and/or wireless networks such as the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), a WiFi network, a WiMax network, a satellite network, a mobile phone network, a mobile data network, a cable network, a telephone network, a fiber optic network, and/or any other suitable communication network, or any combination of any of such networks.

User device(s) 630 can include any suitable device that can communicate with one or more severs though communication network 620, receive user search query, process and transmit data, and/or present search results, and/or perform any other suitable function. For example, a user device 630 can be a mobile phone 631, a tablet computer 633, a laptop computer 635, a desktop computer 637, a set-top box, a television 639, a streaming media player, a game console, and/or any other suitable device.

Although five user devices 631, 633, 635, 637, and 639 are shown in FIG. 6 to avoid over-complicating the drawing, any suitable number of these devices, and any suitable types of these devices, can be used in some embodiments.

Figure 7:
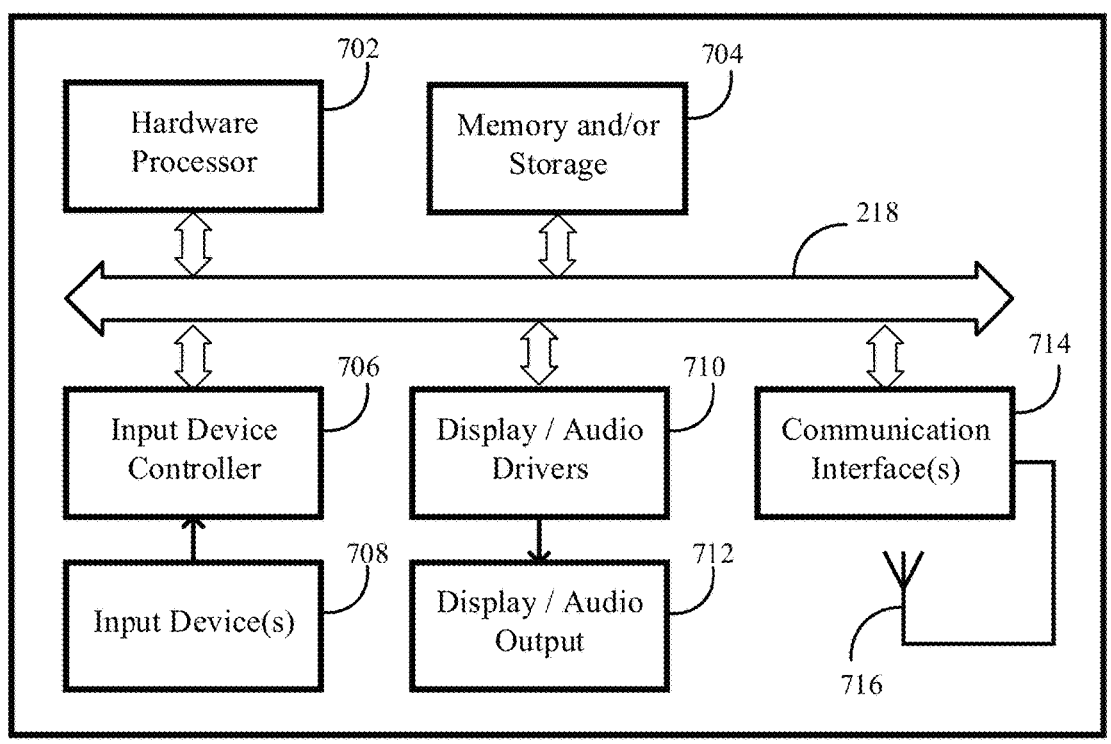
FIG. 7 is a schematic hardware diagram of an exemplary apparatus for fast merging inverted chains in accordance with some other embodiments of the disclosed subject matter.

Server(s) 610 and/or user device(s) 630 can be implemented using any suitable hardware in some embodiments. For example, as illustrated in an exemplary hardware of FIG. 7, such hardware can include a hardware processor 702, memory and/or storage 704, an input device controller 706, an input device 708, display/audio drivers 710, display and audio output circuitry 712, communication interface(s) 714, an antenna 716, and a bus 718.

Hardware processor 702 can include any suitable hardware processor, such as a microprocessor, a micro-controller, digital signal processor, dedicated logic, and/or any other suitable circuitry for controlling the functioning of a general purpose computer or special purpose computer in some embodiments.

Memory and/or storage 704 can be any suitable memory and/or storage for storing programs, data, media content, comments, information of users and/or any other suitable content in some embodiments. For example, memory and/or storage 704 can include random access memory, read only memory, flash memory, hard disk storage, optical media, and/or any other suitable storage device.

Input device controller 706 can be any suitable circuitry for controlling and receiving input from one or more input devices 708 in some embodiments. For example, input device controller 706 can be circuitry for receiving input from a touch screen, from one or more buttons, from a voice recognition circuit, from a microphone, from a camera, from an optical sensor, from an accelerometer, from a temperature sensor, from a near field sensor, and/or any other suitable circuitry for receiving user input.

Display/audio drivers 710 can be any suitable circuitry for controlling and driving output to one or more display and audio output circuitries 712 in some embodiments. For example, display/audio drivers 710 can be circuitry for driving an LCD display, a speaker, an LED, and/or any other display/audio device.

Communication interface(s) 714 can be any suitable circuitry for interfacing with one or more communication networks, such as communication network 620 in some embodiments. For example, interface(s) 714 can include network interface card circuitry, wireless communication circuitry, and/or any other suitable circuitry for interfacing with one or more communication networks.

Antenna 716 can be any suitable one or more antennas for wirelessly communicating with a communication network in some embodiments. In some embodiments, antenna 716 can be omitted when not needed.

Bus 718 can be any suitable mechanism for communicating between two or more of components 702, 704, 706, 710, and 714 in some embodiments.

Any other suitable components can be included in the hardware in accordance with some embodiments.

In some embodiments, any suitable computer readable media can be used for storing instructions for performing the method for fast merging inverted chains described herein.

For example, in some embodiments, computer readable media can be transitory or non-transitory. For example, non-transitory computer readable media can include media such as magnetic media (such as hard disks, floppy disks, and/or any other suitable media), optical media (such as compact discs, digital video discs, Blu-ray discs, and/or any other suitable optical media), semiconductor media (such as flash memory, electrically programmable read only memory (EPROM), electrically erasable programmable read only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

The provision of the examples described herein (as well as clauses phrased as "such as," "e.g.," "including," and the like) should not be interpreted as limiting the claimed subject matter to the specific examples; rather, the examples are intended to illustrate only some of many possible aspects.

Although the disclosed subject matter has been described and illustrated in the foregoing illustrative embodiments, it is understood that the present disclosure has been made only by way of example, and that numerous changes in the details of embodiment of the disclosed subject matter can be made without departing from the spirit and scope of the disclosed subject matter, which is only limited by the claims which follow. Features of the disclosed embodiments can be combined and rearranged in various ways. Without departing from the spirit and scope of the disclosed subject matter, modifications, equivalents, or improvements to the disclosed subject matter are understandable to those skilled in the art and are intended to be encompassed within the scope of the present disclosure.

What is claimed is:

1. A method for fast merging inverted chains performed by a hardware processor, comprising:
   pre-setting an inverted index including a plurality of inverted chains and recording a length of each inverted chain;
   searching the inverted index and obtaining a subset of the plurality of inverted chains that correspond to at least one keyword;
   sorting the subset of the plurality of inverted chains in an ascending order of the lengths of the subset of multiple inverted chains; and
   sequentially merging the subset of the plurality of inverted chains as the ascending order, wherein the merging includes:
      merging one of the subset of the plurality of inverted chains that has a shortest length with one of the subset of the plurality of inverted chains that has a second shortest length to generate an inverted chain including the one of the subset of the plurality of inverted chains that has the shortest length and the one of the subset of the plurality of inverted chains that has the second shortest length, and
      merging the inverted chain with one of the subset of the plurality of inverted chains that has a third shortest length.

2. The method of claim 1, wherein pre-setting the inverted index further comprises:
   generating a plurality of inverted chains that contain retrieval units and semantic units.

3. The method of claim 2, wherein each retrieval unit comprises at least one search keyword obtained by a small granularity text segmentation scheme.

4. The method of claim 2, wherein each semantic unit comprises at least one search keyword obtained by a large granularity text segmentation scheme.

5. The method of claim 1, wherein pre-setting the inverted index further comprises:
   sorting a plurality of documents recorded by the inverted chains in accordance with multidimensional features to rank high-quality documents near the head positions of the inverted chains.

6. The method of claim 5, wherein the multidimensional features of a document comprises author information of the document, view number of the document, quality information of the document.

7. The method of claim 1, wherein the at least one keyword is generated by using multi-granularity text segmentation scheme to a text associated with a user search query.

8. The method of claim 1, wherein the subset of the plurality of inverted chains are sorted by using one of the following methods: insertion sorting method, bubble sorting method, and selection sorting method.

9. The method of claim 5, further comprising:
   suspending the merging process of the subset of multiple inverted chains when a preset number of documents ranked near the head positions of the inverted chains are recalled.

10. The method of claim 5, wherein the inverted index is set by using one of dichotomy method, trie method, and hash method.

11. An apparatus for fast merging inverted chains, comprising:
   a hardware processor, wherein the hardware processor is configured to:
      pre-set an inverted index including a plurality of inverted chains and record a length of each inverted chain;
      search the inverted index and obtaining a subset of the plurality of inverted chains that correspond to at least one keyword;

sort the subset of the plurality of inverted chains by an ascending order of the lengths of the subset of multiple inverted chains; and sequentially merge the subset of the plurality of inverted chains as the ascending order, wherein the hardware processor is further configured to:

merge one of the subset of the plurality of inverted chains that has a shortest length with one of the subset of the plurality of inverted chains that has a second shortest length to generate an inverted chain including the one of the subset of the plurality of inverted chains that has the shortest length and the one of the subset of the plurality of inverted chains that has the second shortest length, and merge the generated inverted chain with one of the subset of the plurality of inverted chains that has a third shortest length.

12. The apparatus of claim 11, wherein the processor is further configured to generate a plurality of inverted chains that contain retrieval units and semantic units.

13. The apparatus of claim 12, wherein each retrieval unit comprises at least one search keyword obtained by a small granularity text segmentation scheme.

14. The apparatus of claim 12, wherein each semantic unit comprises at least one search keyword obtained by a large granularity text segmentation scheme.

15. The apparatus of claim 11, wherein the hardware processor is further configured to:

sort a plurality of documents recorded by the inverted chains in accordance with multidimensional features to rank high-quality documents near the head positions of the inverted chains.

16. The apparatus of claim 15, wherein the multidimensional features of a document comprises author information of the document, view number of the document, quality information of the document.

17. The apparatus of claim 11, wherein the hardware processor is further configured to generate the at least one keyword by using multi-granularity text segmentation scheme to a text associated with a user search query.

18. The apparatus of claim 11, wherein the hardware processor is further configured to sort the subset of the plurality of inverted chains by using one of the following methods: insertion sorting method, bubble sorting method, and selection sorting method.

19. The apparatus of claim 15, wherein the hardware processor is further configured to suspend the merging process of the subset of multiple inverted chains when a preset number of documents ranked near the head positions of the inverted chains are recalled.

20. The apparatus of claim 15, wherein the hardware processor is further configured to set the inverted index by using one of dichotomy method, trie method, and hash method.

* * * * *